Oct. 5, 1965  J. R. FRYAR  3,210,270
FLUID SEPARATION AND GAS DEHYDRATION PROCESS
Filed Dec. 1, 1961
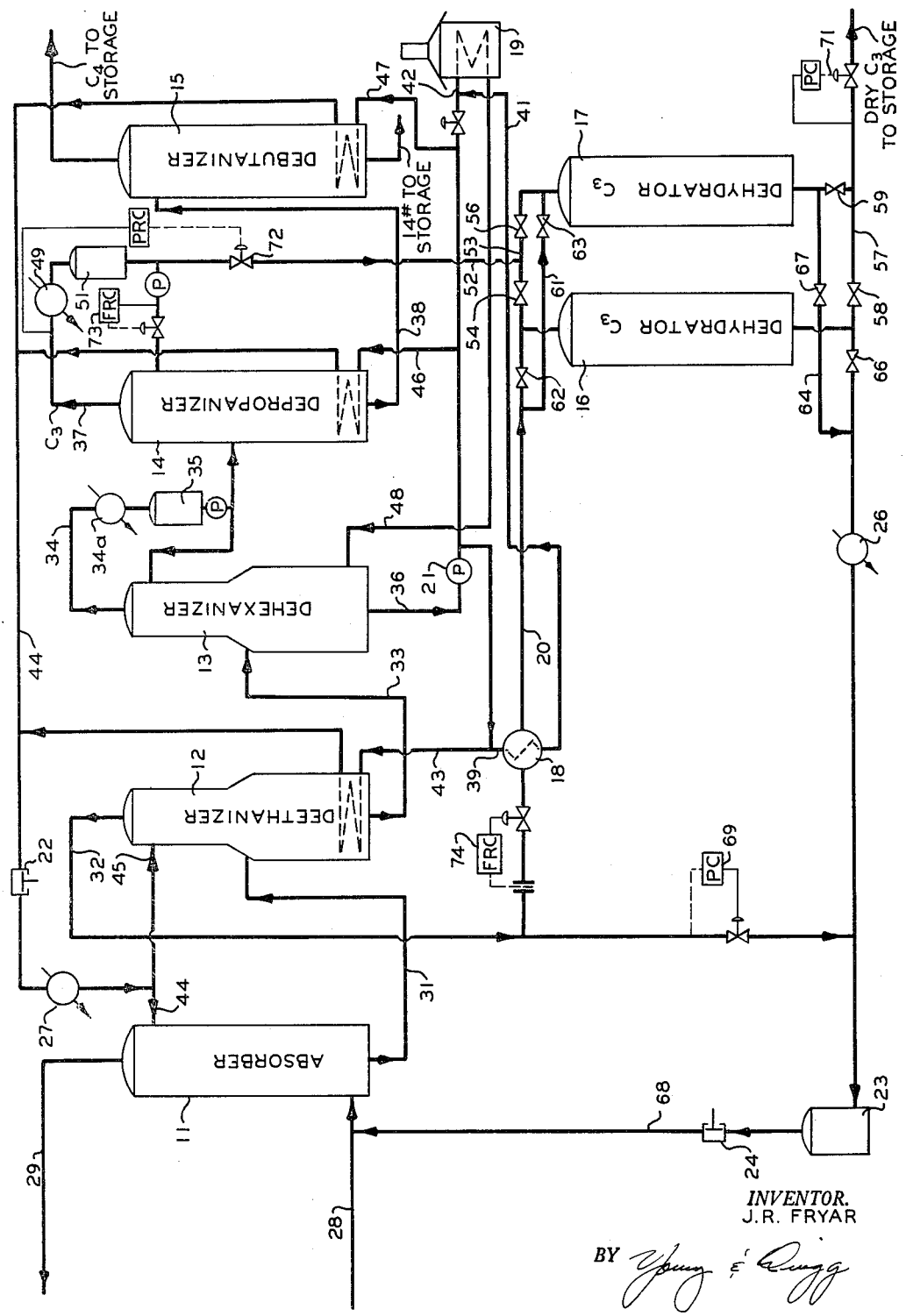
INVENTOR.
J. R. FRYAR
BY *Young & Quigg*
ATTORNEYS 3,210,270
FLUID SEPARATION AND GAS DEHYDRATION PROCESS
Jack R. Fryar, Bartlesville, Okla., assignor to Phillips Petroleum Company, a corporation of Delaware
Filed Dec. 1, 1961, Ser. No. 156,356
2 Claims. (Cl. 208—341)

This invention relates to fluid separation. In one aspect the invention relates to a fluid separation process including an absorption, a subsequent separation of products from the rich oil from the absorption, the utilization of a relatively light product removed from the rich oil to regenerate a dehydration medium for drying a subsequently removed heavier product, and utilizing heat in the lean oil to heat the light material prior to regeneration of the dehydration medium and for supplying heat to distillation zones. In another aspect this invention relates to apparatus especially suited for carrying out this process.

Fluid separation plants, usually called gasoline plants, are commonly used to remove from natural gas, liquefiable components including propane, butane, and heavier components, commonly called natural gasoline, both to make the gas easier to handle and process for fuel use, and to utilize the valuable components removed. In such an operation it is highly advantageous to utilize energy as efficiently as possible and, since very large volumes are handled, a relatively insignificant unitary saving often results in a sizable total increase in the profit from the operation.

An object of this invention is to provide a fluid separation process which makes efficient use of energy supplied.

Another object of this invention is to provide improved fluid separation and treatment apparatus.

Other aspects, objects and the advantages of my invention are apparent in the written description, the drawing, and the claims.

According to my invention there is provided a fluid separation process including the steps of contacting a wet gas with a lean absorption oil in an absorption zone and removing from the absorption zone the dried gas and the enriched absorption oil. The rich oil is passed to a distillation zone where a relatively light fraction is removed and the partially denuded oil is subsequently further denuded and a heavier fraction recovered. The denuded oil is passed in indirect heat exchange with the relatively light fraction which is used to regenerate the dehydration medium used to dry the relatively heavy fraction.

In the operation of a gasoline plant according to my invention, a wet gas is contacted in an absorption zone with a lean absorption oil thereby removing from the gas substantially all of the $C_3$ and heavier hydrocarbons and a portion of $C_2$. The rich oil is passed to a first distillation zone where the $C_2$ is removed and the partially denuded oil passed to a second distillation zone. Here the oil is completely denuded, the lean oil being removed for further division as explained below and the remaining products passed to a third distillation zone. Here the propane is removed overhead and the butane and heavier passed to a fourth distillation zone. In the fourth distillation zone a butane stream is removed overhead and a natural gasoline stream below. The propane is passed through dehydration zones alternately with the $C_2$ removed from the first distillation zone which is used to regenerate the dehydration medium. Prior to passage through the dehydration the $C_2$ is heated by indirect heat exchange with a portion of the lean oil removed from the second distillation zone. Other portions of the lean oil are passed in indirect heat exchange with the first, third and fourth distillation zones to supply heat thereto. Some of the lean oil is heated and returned to the second distillation zone. The portions used to heat the first, third and fourth distillation zones are combined and returned to the absorption zone. The $C_2$ after use as a regenerating gas is recompressed and combined with the wet gas stream to the absorption zone.

Further, according to my invention, there is provided apparatus for fluid separation including an absorber, means to partially denude the rich oil from the absorber by removing a light fraction therefrom, means to remove a heavier fraction and pass it through a pair of dehydration chambers, means to regenerate the dehydration chambers alternately with the light fraction removed from the rich oil, and means to supply heat to this fraction from a portion of the lean oil.

In the drawing, which illustrates schematically a gasoline plant embodying my invention, there are provided absorber 11, distillation columns 12, 13, 14 and 15, dehydrator chambers 16 and 17, heat exchanger 18, heater 19, pumps 21 and 22, scrubber 23, compressor 24, regeneration gas cooler 26, and lean oil cooler 27.

Wet gas from a suitable source, such as an oil or gas field collection system, is introduced through pipe 28 into absorber 11. Dry gas, that is gas having most of the $C_2$ and heavier hydrocarbons and a portion of the $C_2$ hydrocarbons removed therefrom, is removed from absorber 11 through pipe 29. The rich oil is passed through pipe 31 to distillation column 12, which is operated as a rich oil deethanizer, $C_2$ hydrocarbons being removed through pipe 32 and the partially denuded rich oil through pipe 33 to distillation column 13 which is operated as a dehexanizer. The removal of $C_6$ and lighter hydrocarbons through pipe 34 to distillation column 14 leaves the substantially denuded lean oil to be removed through pipe 36. Column 14 is operated as a depropanizer, $C_3$ hydrocarbon being taken overhead through pipe 37 while the $C_4$ and heavier hydrocarbons are removed through pipe 38 to distillation column 15. In column 15 butane is removed overhead, leaving a 14-pound Reid vapor pressure natural gasoline to be removed from the bottom.

The hydrocarbons removed through pipe 34 are condensed in reflux cooler 34a and passed into accumulator 35, from which they are pumped to distillation column 13 as reflux and to distillation column 14 as feed.

The lean oil from column 13 passes through pump 21. A portion is removed through pipe 39 and passed through heat exchanger 18 in indirect heat exchange with the $C_2$ hydrocarbons from distillation column 12 and then returned through pipe 41 to the inlet 42 of heater 19. Another portion of the lean oil is passed through pipe 43 to supply heat to distillation column 12 and is returned to pipe 44, which is the inlet for pump 22. Similarly, other portions of the lean oil are removed through pipes 46 and 47 and passed in indirect heat exchange with distillation columns 14 and 15, respectively, and returned to pipe 44 and fed to absorber 11. A portion of the lean oil also is fed through line 45 into the top of distillation column 12 through pipe 45, which connects with pipe 44. The lean oil which passed through heater 19 is passed through pipe 48 to column 13 to supply heat therefor.

The $C_3$ hydrocarbons removed from column 14 through pipe 37 pass through a reflux cooler 49 and accumulator 51 and that portion not used for reflux conducted through pipe 52 to manifold 53, which is provided with valves 54 and 56 by which the $C_3$ hydrocarbons are directed alternately to the dehydrators 16 and 17, the dehydrated hydrocarbons being removed through manifold 57 from valves 58 and 59 alternately to storage, further processing or use. A portion of the $C_2$ hydrocarbons removed through pipe 32 are conducted through pipe 20, heat exchanger 18, through manifold 61, including valves 62 and 63 which permits the $C_2$ hydrocarbon to be directed to the dehydrators 16 and 17 alternately, dehydrating of one of these chambers being done simultaneously with the use of the other as a dryer for the $C_3$ hydrocarbons. The $C_2$ hydrocarbons are removed through a manifold 64 and valves 66 and 67, through cooler 26 to scrubber 23, the scrubbed gas being compressed in compressor 24 and returned through pipe 68 to pipe 28.

Pressure control valves 69, 71 and 72 are provided, as shown, as are flow controllers 73 and 74.

It will be recognized by those skilled in the art that this drawing is greatly simplified and although certain control valves are shown other such valves, additional pumps, controls, etc., can be used as necessary and desired.

*Example*

In an example of an operation of a gasoline plant according to my invention, the inlet gas in line 28 is at a pressure of 395 p.s.i.g. Deethanizer 12 has a top temperature of 95° F. and a kettle temperature of 236° F. and is operated at about 250 p.s.i.g. Dehexanizer 13 operates at temperatures of 191° F. and 519° F. at the top and bottom, respectively, and has top and bottom pressures of 120 p.s.i.g. and 125 p.s.i.g. Depropanizer 14 has top and bottom temperatures, respectively, of 125° F. and 247° F. and top and bottom pressures of 260 p.s.i.g. and 265 p.s.i.g. Debutanizer 15 is operated with temperatures of 127° F. and 256° F. at top and bottom, respectively, and pressure bearing from 110 p.s.i.g. at the top to 115 p.s.i.g. at the bottom. The temperature of the regenerator gas which is fed through line 20 is raised from 100° F. to 400° F. in heat exchanger 18 by exchange with a portion of the hot oil circulated through line 39. The propane stream removed from accumulator 51 is at 100° F. and 250 p.s.i.g. The pressure downstream of valve 72 is essentially equal to the product vapor pressure. The dehydration medium used in chambers 16 and 17 is bauxite.

Table I lists the relative amounts and composition of the pertinent streams, the column numbers corresponding with the pipe numbers in the drawing.

TABLE I
*Material balance—mols per day*

| Stream Number | 20 | 28 | 28+68 | 29 | 31 | 32 | 33 | 34 | 38 | 39 |
|---|---|---|---|---|---|---|---|---|---|---|
| | Regen. gas | Inlet gas | Absorber inlet | Primary absorber residue | Rich oil | Recycle gas | Dehex. feed | Deprop. feed | Debut feed | Hot oil to heater |
| Stream name: | | | | | | | | | | |
| $CO_2$ | | 118 | 126 | 112 | 16 | 22 | | | | |
| $N_2$ | | 5,672 | 5,692 | 5,672 | 45 | 42 | | | | |
| $C_1$ | | 73,532 | 74,738 | 73,307 | 2,738 | 2,735 | | | | |
| $C_2$ | | 10,992 | 11,738 | 10,408 | 2,395 | 2,345 | 173 | 173 | | |
| $C_3$ | | 5,300 | 4,086 | 2,093 | 2,537 | 439 | 3,286 | 3,286 | 1,485 | |
| $IC_4$ | | 602 | 303 | 10 | 597 | 5 | 572 | 572 | 629 | |
| $NC_4$ | | 1,290 | 553 | 0 | 1,290 | 24 | 1,277 | 1,277 | 1,404 | |
| $IC_5$ | | 296 | 66 | 0 | 298 | 2 | 296 | 296 | 326 | |
| $NC_5$ | | 306 | 57 | 0 | 308 | 2 | 306 | 306 | 336 | |
| $C_6$ | | 227 | 16 | 0 | 227 | 0 | 788 | 394 | 250 | |
| $C_{7+}$ | | 168 | 4 | 0 | 168 | 0 | | | 185 | |
| MSO | | | | 0 | 3,756 | 0 | 4,113 | | | |
| Total mols per day | | 98,503 | 97,379 | 91,602 | 15,315 | 4,742 | 10,811 | 6,305 | 4,615 | |
| G.p.d | | | | | 168,048 | | 178,122 | 73,109 | | 17,850,600 |
| G.p.m | | | | | 116.7 | | 123.7 | 50.77 | | |
| Lb./hr | | 87,420 | 80,978 | 71,377 | 37,258 | 4,469 | 39,258 | 13,951 | 8,526 | |
| Mc.f.d | 103.2 | 37,500 | 37,079 | 34,833 | | 1,805 | | | | |
| Mol wt | | 21.3 | 19.96 | 18.7 | | 22.62 | | | | |
| Sp. gr. at 60° F | | .735 | .689 | .645 | .639 | .78 | .64 | .55 | | |

| Stream number | 42 | 43 | 44 | 45 | 46 | 47 | 52+57 | LPG to storage | 14# gaso. to storage |
|---|---|---|---|---|---|---|---|---|---|
| | Hot oil to furnace | Hot oil to deeth reboiler | Primary absorber lean oil | Deeth lean oil reflux | Hot oil to deprop. kettle | Hot oil to debut kettle | Propane product to storage | | |
| Stream name: | | | | | | | | | |
| $CO_2$ | | | | | | | | | |
| $N_2$ | | | | | | | | | |
| $C_1$ | | | | | | | | | |
| $C_2$ | | | | | | | 190 | | |
| $C_3$ | | | | | | | 3,536 | 1,485 | |
| $IC_4$ | | | | | | | 59 | 628 | 1 |
| $NC_4$ | | | | | | | 10 | 1,353 | 51 |
| $IC_5$ | | | | | | | | 5 | 321 |
| $NC_5$ | | | | | | | | 1 | 335 |
| $C_6$ | | | | | | | | | 250 |
| $C_{7+}$ | | | | | | | | | 185 |
| MSO | | | | | | | | | |
| Total mols per day | | 2,885 | 3,965 | 843 | 2,951 | 2,176 | 3,805 | 3,472 | 1,143 |
| G.p.d | 712,800 | 69,120 | 95,000 | 18,000 | 68,112 | 50,256 | 39,707 | 39,556 | 16,813 |
| G.p.m | 495 | 48 | .66 | 12.5 | 47.3 | 34.9 | 27.57 | 27.47 | 11.68 |
| Lb./hr | 180,576 | 17,514 | 24,066 | 5,118 | 17,260 | 12,727 | 6,906 | 7,531 | 3,760 |
| Mc.f.d | | | | | | | | | |
| Mol wt | 140 | 140 | 140 | 140 | 140 | 140 | 43.55 | .522 | |
| Sp. gr. at 60° F | .73 | .73 | .73 | .73 | .73 | .73 | .50 | | .644 |

Reasonable variation and modification are possible within the scope of my invention which sets forth process and apparatus for fluid separation utilizing a single heated oil stream to supply heat to a plurality of distillation zones and to heat a dehydrator regenerator gas.

I claim:

1. A fluid separation process comprising the steps of contacting a wet gas with a lean absorption oil in an absorption zone, removing from said absorption zone a dry gas and a rich absorption oil, passing said rich oil to a first distillation zone, removing a relatively light fraction, comprising the most volatile portion of the components absorbed from said wet gas by said rich oil, and a partially denuded oil from said first distillation zone, subsequently denuding said oil to produce a denuded oil and a heavier fraction recovered therefrom, passing the denuded oil in indirect heat exchange with said relatively light fraction thereby heating said fraction, passing at least a portion of said heavier fraction through a first zone of dehydration medium, simultaneously passing the heated, relatively light fraction through a second dehydration medium to remove water therefrom, periodically changing the flow to pass said heavier fraction through said second zone of dehydration medium and said relatively light fraction through said first zone of dehydration medium, and returning said relatively light fraction to said wet gas.

2. A fluid separation process comprising the steps of contacting a wet gas with a lean absorption oil in an absorption zone, removing from said absorption zone a dry gas and a rich absorption oil, passing said rich oil to a first distillation oil, removing a stream containing ethane and a partially denuded oil from said first distillation zone, passing said partially denuded oil to a dehexanizer, removing a stream comprising hexane and lighter overhead and a lean oil from the bottom thereof, passing said stream containing hexane and lighter to a depropanizer, removing propane overhead and butane and heavier from the bottom thereof, passing said stream containing butane and heavier to a debutanizer, removing a stream containing butane overhead and a stream containing natural gasoline from the bottom thereof, passing said overhead containing propane through a first zone of dehydration medium, passing a portion of said lean oil in heat exchange with said stream containing ethane thereby heating said stream, passing said heated stream through a second zone of dehydration medium to remove water therefrom, periodically changing the flow to pass said propane through said second zone of dehydration medium and said stream containing ethane through said first zone of dehydration medium, returning said stream containing ethane to said wet gas, passing a second portion of said lean oil to indirect heat exchange with said depropanizer, passing a third portion of said lean oil in indirect heat exchange with said debutanizer, combining said second and third portions of lean oil and returning to said absorption zone, heating all of said lean oil except said second and third portions and returning to said dehexanizer.

References Cited by the Examiner
UNITED STATES PATENTS

| | | | |
|---|---|---|---|
| 1,640,747 | 8/27 | Braun | 208—341 |
| 2,290,957 | 7/42 | Hachmuth | 208—341 |
| 2,297,675 | 10/42 | Dayhuff et al. | 208—341 |
| 2,339,680 | 1/44 | Carney | 208—341 |
| 2,409,691 | 10/46 | Noble | 208—341 |
| 2,573,341 | 10/51 | Kniel | 208—341 |
| 2,589,114 | 3/52 | Murray | 208—341 |

OTHER REFERENCES

"Oil and Gas Journal," vol. 49, No. 6, June 15, 1950, pages 112, 133 and 116.

ALPHONSO D. SULLIVAN, *Primary Examiner.*